J. F. COOK.
TRAP NEST.
APPLICATION FILED OCT. 7, 1920.

1,393,756. Patented Oct. 18, 1921.

WITNESSES

INVENTOR
Joseph F. Cook,
BY
ATTORNEYS

UNITED STATES PATENT OFFICE.

JOSEPH F. COOK, OF SAN FRANCISCO, CALIFORNIA.

TRAP-NEST.

1,393,756.

Specification of Letters Patent.  Patented Oct. 18, 1921.

Application filed October 7, 1920. Serial No. 415,397.

*To all whom it may concern:*

Be it known that I, JOSEPH F. COOK, a citizen of the United States, and a resident of San Francisco, in the county of San Francisco and State of California, have invented certain new and useful Improvements in Trap-Nests, of which the following is a specification.

This invention relates to poultry nests and has reference more particularly to nests intended to serve as a trap nest by the use of which the hen may be pedigreed, and enable an accurate record to be kept of the laying qualities of the respective hens, as well as of the eggs laid, as to their quality and date of laying.

An object of this invention is to provide a nest which can be so arranged as to train a hen to use a certain nest which will facilitate the keeping of certain records.

Another object is to provide a poultry nest which is capable of use as a trap of such character that when the hen enters the nest the egress of the imprisoned hen will be prevented, or it may be arranged to permit perfect freedom of ingress and egress.

With these and other objects in view, the invention consists in certain novel features of construction, arrangement and combination of parts reference being had to the accompanying drawings, forming a part hereof in which—

Figure 1:
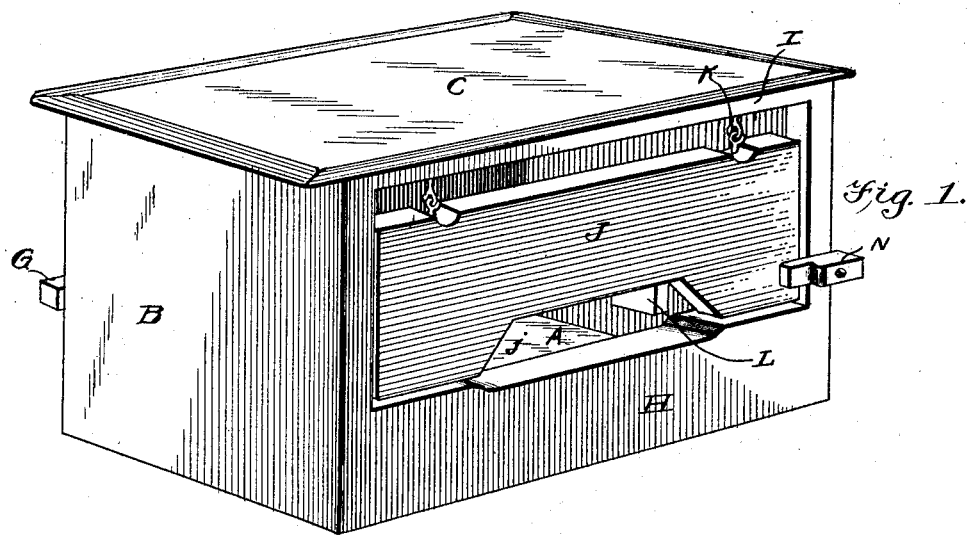
Figure 1 is a perspective view of a single nest of my invention.
Figure 2:
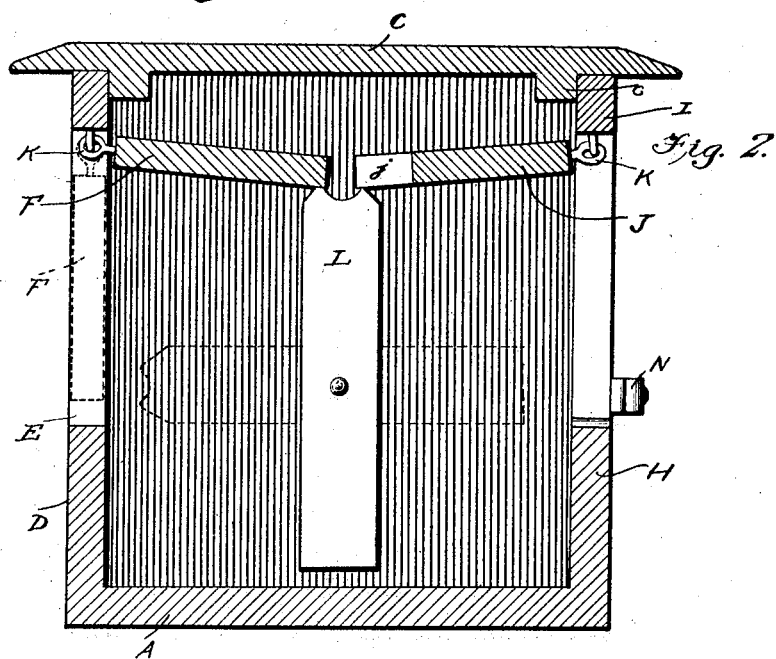
Fig. 2 is a central vertical section through same.
Figure 3:
Fig. 3 is a perspective view of a latch removed from the nest.

Each nest, whether used singly or in a lateral series or battery of cells, comprises a box-like structure having a tight bottom A, sides B, and top C, which may be integral with the sides or, and preferably, made removable as a whole by cleats *c* on its under side which fit within the top opening of the box.

The rear wall D of the box extends only a portion of the way upwardly, so that a space E is left at the upper portion, and in this space is hung by suitable hinges a solid door F the hinges being of such character that said door may swing both inwardly and outwardly; the door F is of such height that when in its closed position it, with the rigid rear wall D will present a practically continuous solid rear wall, so that little or no light can enter the nest from the rear. To one of the side walls at the rear a turn button G is applied which may be swung into position to prevent the rear door from being swung outwardly.

The front of the nest comprises, a rigid lower front wall H, above which is an opening extending between the side walls, and a top cross bar I to which latter the front door J is hung by hinges K of such character that this door may also swing either inwardly or outwardly; the front door J is provided with a notch *j* in its lower edge and preferably centrally, in which the hen extends her head and neck in going in and coming out of the nest.

Within the box constituting the nest and upon either or both of the side walls, I attach a movable latch L which consists of a strip of wood having its upper end dished to form a groove; the latch L is secured to the side wall by a pivot screw M so that normally it will hang in a substantially vertical position.

The upper end of the latch is so positioned that it will support the front and rear doors in a substantially horizontal position so that the nest is left practically completely open and free passage afforded therethrough.

The object in making the latch of such size and locating it in such position relative to the two doors, front and rear is that they may be both held in open position at the same time during the period that the hens are being trained to make use of the trap nests. Thus, the nests are left completely open for a period of a week or so and the hens given free run with them; this usually results in a hen selecting a particular nest. The next period of training is put into effect by closing the rear door, and moving the turn button so that it cannot be opened from the inside. The front door is left to be swung in or out, giving the hen perfect liberty to go and come. This period usually consumes about one week. For the next period the turn buttons N which are pivoted to the side wall or walls at the front, are moved into such position that while the hen can enter the nest she cannot now leave it and is consequently trapped and can only be removed by the attendant and this is generally done by removing the top, or through the rear.

As each hen is marked, usually by a band on the leg, the attendant can by the use of my improved nest keep a record of each hen as to prolificness, etc., and the eggs of each individual hen can be identified.

To prevent the use of a nest by more than one hen at the same time I propose to prevent the entry of a second hen by swinging the latch to a horizontal position which will bring its ends adjacent to the front and rear doors and prevent them being swung inwardly.

By making the top removable the nest can be readily cleaned by swinging the front and rear doors to horizontal position within the box and throwing the latch into such position that the lower ends of the doors may rest on the notched upper end of the said latch.

I claim:—

1. A poultry trap nest comprising a nest box having solid top, bottom and side walls, front and rear doors hingedly mounted to swing inwardly and outwardly, means for limiting the outward swing of said doors, and a common latch means within the nest box to maintain said doors in horizontal position within the nest to permit free passage through the same from the front or rear.

2. A poultry trap nest comprising a nest box having solid bottom, top and side walls, lower front and rear walls providing entrance and exit openings below the top wall, doors hingedly mounted in said openings to swing inwardly and outwardly, a common latch means pivotally secured to a side wall within the box, to maintain either or both of said doors in a horizontal position within the nest, and stop means on the exterior of the box to prevent outward swing of either or both doors, whereby egress from the nest will be prevented.

3. A poultry trap nest comprising a nest box having solid bottom, top and side walls, solid front and rear walls across the lower portion of the front and rear of the box defining front and rear openings between the top wall and the said front and rear lower walls, a solid door hingedly mounted in the rear opening to swing inwardly and outwardly, stop means movably mounted exteriorly of the box at the rear to prevent outward swinging movement of said rear door, and similar stop means similarly mounted exteriorly of the box at the front thereof to prevent outward swinging movement of said front door, said front door having a notch in its lower edge to permit introduction of the head and neck of the hen, and a common latch movably mounted on a side wall within the box adapted to maintain both the front and rear doors, in a horizontal position within the nest box at one and the same time.

4. A poultry trap nest comprising a nest box having swinging front and rear doors, said doors hingedly mounted in such manner that they may swing inwardly and outwardly of the box, means for limiting the outward swing of said doors, a common latch means within said box for both of said doors, said latch means including a strip of such width and length pivotally secured to a side wall of the box and within the same, that when in one position it will support both doors in a horizontal position within the box, and in another position its ends will be adjacent both of said doors and prevent the same being swung inwardly from closed position.

5. A poultry trap nest comprising a nest box having front and rear doors hingedly mounted to swing inwardly and outwardly, means for restraining the outward swing of said doors, and a common latch means within the nest box to maintain said doors in a horizontal position within the nest to permit the free passage through the same from the front or rear.

JOSEPH F. COOK.